July 20, 1948.  R. G. HOPPES  2,445,354
HELICOPTER
Filed Nov. 6, 1944  2 Sheets-Sheet 1
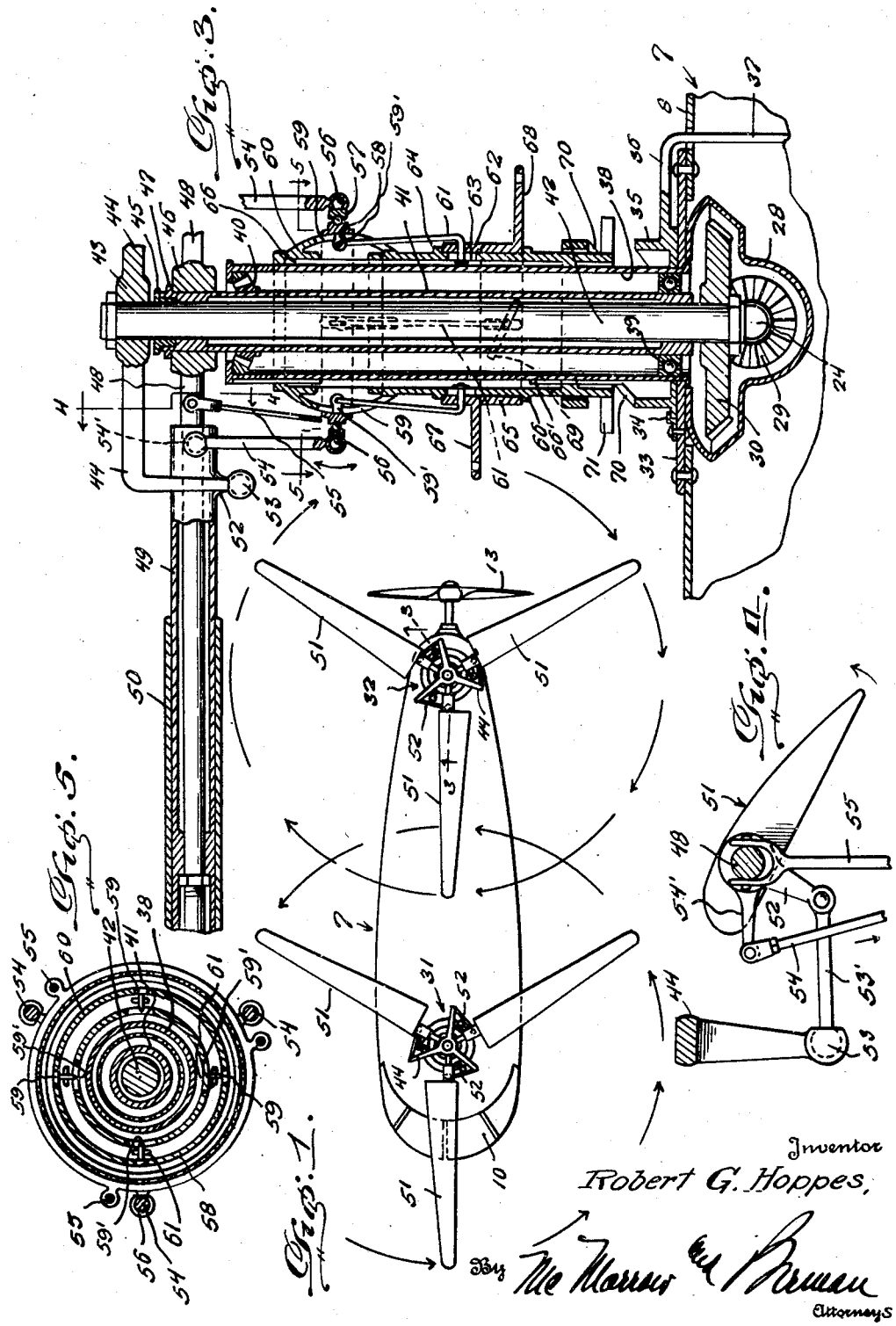
Inventor
Robert G. Hoppes,
Attorneys July 20, 1948.  R. G. HOPPES  2,445,354
HELICOPTER
Filed Nov. 6, 1944  2 Sheets-Sheet 2
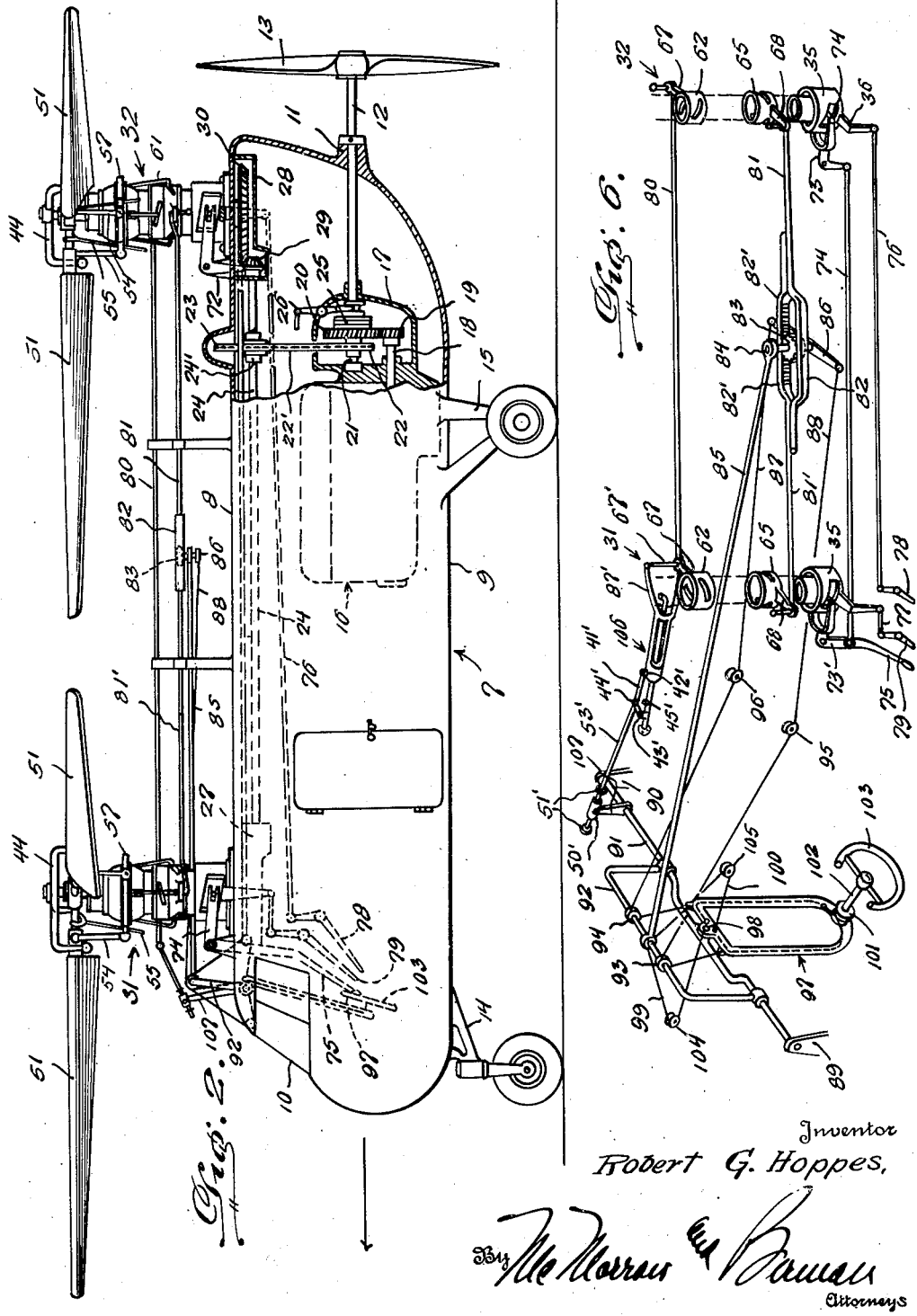
Inventor
Robert G. Hoppes, Patented July 20, 1948

2,445,354

UNITED STATES PATENT OFFICE 2,445,354

HELICOPTER

Robert G. Hoppes, Washington C. H., Ohio

Application November 6, 1944, Serial No. 562,085

7 Claims. (Cl. 244—17)

The invention relates to improvements in helicopter-type aircraft, and more particularly in helicopter-type aircraft of the dual rotor class, important objects of the invention being to provide such aircraft, having the following features and advantages:

Improved positioning of the lifting rotors with relation to the body or fuselage of the craft.

The feature of making the ascending and the descending pitches of the rotor blades change from one to the other automatically as the driving torque is applied or removed, an overriding clutch in the drive providing for this action.

The feature enabling steering and maneuvering the machine in flight by altering the positive pitch of the rotating blades to get the desired effect either while in ascending or descending flight.

The feature of neutralizing the effect of torque of the rotating rotors upon the body and converting it into useful lift and thrust.

The feature of the simplified design and operation of the controls, the method of applying power to the rotors and keeping their speed whereby the front and rear rotors which rotate in opposite directions are synchronized.

The feature of distributing the weight of the body and mechanisms evenly under the lifting rotors so that the center of gravity is midway between the front and rear rotors. By permitting the weight of the mechanism to the rear of the center of gravity to balance the weight of the operators and mechanisms at the front of the center of gravity, the useful load space can be located at the center of gravity. This prevents the loading and unloading of the useful load from upsetting the balance of the craft.

The feature of adjusting the average maximum pitch of the blades of the individual rotors separately in order to compensate for light and heavy loads or for the load being slightly heavier in front or behind, in order to maintain level flight. This adjustment affects both the settling gliding pitch of the rotor blades and the lifting pitch of same.

The design of the craft which keeps the body level in flight, or while landing or taking off as well as when at rest on the ground. The pendulum effect of the craft in flight is very small when compared to a single rotor craft. The pendulum effect in this craft is noticed only while flying directly sidewise and while turning, and not while flying forwardly and rearwardly.

The feature of locating the power plant, the operators, the useful load space, as well as most of the mechanism compactly within the streamlined fuselage or body of the craft.

The feature of utilizing the momentum of the rotating blades after descending by tilting them to a lifting angle by means of separate lever mechanism when approaching the ground in landing, so as to create a lift for cushioning the shock of landing.

The feature of utilizing and driving an auxiliary conventional type propeller at the rear end of the fuselage to gain more forward speed at the will of the operator when this feature is incorporated into the design of the machine.

The foregoing and other features and advantages will appear in the following description and the appended drawings, wherein merely for illustration, a preferred embodiment of the invention is shown.

In the drawings—

Figure 1 is a top plan view on a reduced scale of my improved aircraft, indicating by arrows the opposite rotation of the lifting rotors;

Figure 2 is a left hand side elevation of the craft partly broken away to show details of the rotor drive;

Figure 3 is an enlarged vertical longitudinal sectional view taken on the line 3—3 of Figure 1, showing details of construction of one of the rotor units;

Figure 4 is a fragmentary transverse section taken along the line 4—4 of Figure 3, illustrating pitch adjustment of the rotor blades;

Figure 5 is an enlarged horizontal section taken along the line 5—5 of Figure 3 and looking downwardly;

Figure 6 is a schematic view showing the relation and operation of the flight control elements.

Referring in detail to the drawings, the body or fuselage 7 may be of an elongated rearwardly tapering form having substantially flat and parallel top 8 and bottom 9, with a windowed control cabin 10 at the forward end and a horizontal axis propeller mount 11 at its rear end, mounting the propeller shaft 12 projecting forwardly into the fuselage and having the pusher propeller 13 at its rear end. Suitable forward and rearward landing wheel gear 14, and 15, respectively, are provided for landing and take-off purposes.

A suitable type of driving engine or motor 16 is located within the fuselage over the rear landing gear and to the rear of the center of gravity of the craft and in position to counterbalance the weight of the controls and of the operator or operators of the craft in the control cab 10.

A case 17 on the rear of the motor 16 encloses a portion of the motor drive shaft 18 which has a pinion 19 in mesh with a gear 20 on a stubshaft 21 which includes a sprocket wheel 22 on which is trained a sprocket chain 22' which is trained also over a sprocket wheel 23 on the rotor driving shaft 24 which is supported just under the top of the fuselage and includes a free-wheel or over-running device 24'. A clutch mechanism 25 having an operating lever 26 is aligned with the stubshaft 21 and gear 20 whereby the propeller shaft 12 may be connected and disconnected at will to be driven by the motor 16.

The front and rear ends of the rotor driving shaft 24 are supported by housings 27 and 28 mounted on the top and within the fuselage where the ends of the shaft 24 have bevel pinions 29 meshed with the bevel rotor gears 30 of the similar rotor units which are generally designated 31 and 32, respectively.

Each rotor unit comprises the annular stationary base 33 secured over an opening in the top of the fuselage, on which is rotatably mounted by a confining flange 34 a vertical cylindrical housing 35 having a radial control lever 36 extending therefrom and having a deflected portion 37 depending into the fuselage. Concentrically within the housing 35 and secured to the base 33 is a cylindrical tube 38 on the exterior of which portions of the housing bear and which contains at its lower end a ball-bearing structure 39 and at its upper end a thrust roller-bearing structure 40. Rotatably mounted in the bearings is a tube 41 which has bearings at its upper and lower ends for the rotor drive shaft 42 which has the aforementioned bevel gear 30 fixed on its lower end. On the upper end of the rotor shaft is mounted the spider 43 having the L-shaped pitch levers 44 projecting from its opposite sides and below the element 43, and the bearing 45 secured in the upper end of the tube 41. The rotor blade hub 46 is solidly mounted on the upper end of the tube 41 and limited for upward movement by a flange 47 on the bearing 45.

Each of the three rotor blades shown comprises a solid shaft 48 projecting from the hub 46, an inner tube 49 rotatable and slidable thereon, and an outer tube 50 solidly mounted on the inner tube 49, the rotor blade 51 being fixedly mounted on the tube 50. The tube 49 has a radial lever 52 to which the lower end of the lever 44 is ball socketed at 53. A depending link 54 is pivoted to a radial arm 54' on the inner tube 49, and another depending fork 55 is pivoted to opposite sides of the solid shaft 48.

The lower end of the link 54 is ball socketed at 56 to a rotatable ring 57 which is ball-bearing mounted around a nonrotatable annulus 58 which is mounted slidably around a spherical cage 60 which is vertically slidably mounted on the upper part of the cylinder 38. The cage has vertical slots 59 in which work lugs 59' which have eyes to which the upper ends of links 61 are pivoted which depend through the slots 59. One pair of links 61 have their lower ends inwardly directed through a sleeve 62 and thence through inclined slots 63 in the skirt 60' of the cage 60, the sleeve 62 being revolubly confined thereon between a rib 64 on skirt 60' and the upper end of another revoluble sleeve 65 resting on a rib 66 on the skirt 60', the sleeevs having radial arms 67 and 68, respectively. The lower ends of the remaining pair of links 61 engage similarly angulated slots 69 in the sleeve 65 instead of the sleeve 62.

The housing 35 has angulated slots 70 in which work the pins 71 on the lower end of the skirt 60', whereby when the control arm 36 is rotated to rotate the housing the entire cage and skirt structure having the arms 71 can be raised, or lowered from a raised position, and also the cage assembly.

Hinged on a bracket 72 on the top of the fuselage is a bell crank forked lever 73 whose slotted arms engage the pins 71 on the cage skirt working in the inclined slots 70 of the housing 35, the free end of the lever 73 being pivoted to a control rod 74 extending beneath the top of the fuselage to the other rotor unit to whose bell crank fork lever 73' the rod is pivoted. The forward bell crank lever has a handle extension 75 located in the pilot's cabin 10.

The housing rotating arms 36 are separately connected to control rods 76 and 77 and eventually to handles 78 and 79, respectively, located in the pilot's cabin, so that they can be individually and selectively operated.

The arms 67 of the sleeves 62 are connected together by a rod 80. Relatively movable rods 81 and 81' incorporating rack portions 82 and 82' operatively connect the arms 68 together, both rack portions being in mesh with a cooperating pinion 83 on a shaft 84 with which a control rod 85 has one end connected. The pinion shaft also has mounted thereon a cross arm 86 with control cables 87 and 88 connected to opposite ends thereof for rotating the pinion 83 in opposite directions so as to move the rods 81 and 81' relative to each other in opposite directions. The rod 85 moves both rods 81 and 81' together in either direction.

The operating or pilot control mechanism includes the brackets 89 and 90 located in the upper fore part of the cabin 10 and rockably supporting between them the rockshaft 91 which has rotatable thereon the yoke 92 to which the forward end of the rod 85 is pivoted. The yoke carries the pulleys 93 and 94 over which the cables 88 and 89, respectively, are trained, after passing under pulleys 95 and 96, and before attachment to the upper cross bar of a rectangular tubular control frame 97 which is pivoted at the center of the rock shaft 91 for pivoting relative to the rock shaft only on an axis extending generally horizontally and longitudinally of the fuselage, so that pushing the frame in forward and rearward directions will rock the rockshaft 91 in corresponding directions, whether or not the frame 97 is swung sidewise.

Control cables 99 and 100 pass into the interior of opposite sides of the tubular frame 97 and are reversely wound on a drum 101 which is on a shaft 102 which has a pilot's control wheel 103 thereon, these cables being trained over pulleys 104 and 105 and connected with the yoke 92. The forward end of the rod 80 is pivoted to a lost motion linkage 106 which is connected to an arm 107 on the rock shaft 91.

The lost motion linkage 106 includes the pivot 67' which can be the pivot for connecting the rod 80 and the arm 67 of the forward rotor unit. The fork 87' is connected to the pivot 67' and has a tubular extension which slides on a fixed rod having a stop 45' spaced from the opposite end of the tubular extension. The arm 107 has a sleeve 50' pivoted thereon, through which the rod 53' slides, this rod having spaced stops 51' to engage the sleeve 50'. The rear end of the rod 53' is pivoted at 44' to one end of a link 41' whose other end is pivoted at 42' to the forward end of the tubular extension of the fork 87'. Another link is pivoted at one end at 43' to the rod in the tubular extension forwardly of a stop lug 45' on the rod. This arrangement permits movement of the arm 107 on the bar 91 to move initially to extreme forward or extreme rearward position, and subsequently to go through partial return movement without disturbing the position of the arms 67, as is indicated further on herein.

*Operation.*—Referring to the unit of Figure 3, it will be understood that the blades or vanes 51 are free to hinge or oscillate a fixed amount on the spokes 48. The lift of the blades 51 is applied to the craft through the bearings 39 and 40.

The torque of the shaft 42 is applied to the vanes 51 in such a manner that it tilts the vanes up to a climbing angle the instant the torque is applied. This action is described below under Feathering.

The mechanism including the cage 60 produces the automatic feathering of the vanes as described below under Steering.

*Feathering.*—Taking one vane only for simplicity, it will be understood that the drive of the blades is through gear 30, shaft 42, spider 44, link 53' and arm 52 of rotating vane 51. The torque of the spider 44 to the lever of vane 51 tilts the vane up to an angle of incidence or climb, since the arm or lever 52 extends below the center of pull. As the vane is tilted up, the lever 54' also tilts up, and elevates link 54, thereby lifting the entire cage assembly 60 slidably on the cylinder 38, the lower end of the link 54 being connected to the annulus 57 which turns on the non-rotatable ring 58. The cage 60 is keyed at 66' to the cylinder 38. The cage 60 stays up as high as it will go as long as torque is applied to vane assembly by 42. When the torque is stopped or when the power is cut off, the weight of cage 60 and the natural action of the vane tilts it downwardly as far as it will go, this tilting taking place because spoke 48 passes through the vane bushings located ahead of the center of lift of the vane.

The angulated cam slots 70 in the element 35 cooperate with the pins 71 to the extreme elevated position and for the extreme depressed positions of cage 60.

Feathering of the vanes can be done manually if for any reason they do not feather automatically, by moving up or down the single lever 75. The two small levers 78 and 79 which are arranged side by side and in a vertical position, are used to set the two maximum pitch cam slots 70 separately and according to the load, and the driving power used.

*Steering.*—Since the vane rotates and the cage 60 does not, the vane is operatively connected with cage 60 through the link 54 and the rings 57 and 58. The outer ring 57 is moved on the cage by the forked rod 55. The ring 57 cannot move up or down unless entire cage assembly moves up or down. But one side of the ring 57 can be elevated if the other side is depressed correspondingly, independently of whether cage 60 moves up or down. If left side of ring 57 is raised, the right side thereof is depressed in the same amount. When the left side of the ring 57 is raised as indicated above, the pitch of the vane will be greater and gradually becomes less when the ring 57 is tilted toward the right side.

As the lever 67 on sleeve 62 is moved forwardly or rearwardly, the action of the sloping cam slots on the rods 61 (one on right and one on left) tilts the ring 57 upwardly either to the right or to the left.

By moving the lever 68 of sleeve 65 forwardly or rearwardly, the rods 61 (one in front and one behind), tilt the ring 57 toward either side.

Note that slots 63 are cut at similar angles to the vertical in sleeve 62, the purpose of the vertical slots in the skirts 60' being merely to prevent the rods 61 from following sleeves 62 and 65 as they are rotated. It should also be noted that ring 57 can be tilted to an angle either while cage 60 is in the elevated position or while it is in the depressed position, thereby giving the operator steerability with either ascending or descending blade-pitch.

*Vertical and hovering flight.*—For the machine to lift itself from the ground, the steering handle 103 is left in the intermediate or hands-off position. Then power is applied to the vane rotors by opening the throttle of the engine. To get more or less lift the vane rotors are speeded up or slowed down. A power plant with wide speed range is essential. When vane rotor speed has become great enough, the machine lifts itself from the ground vertically. When a certain altitude is reached, the craft hovers there until more or less power is applied.

When power is applied, the torque of shaft 42 and spider 44 against arm 52 causes vanes 51 to feather to a climbing pitch. This causes cage 60, because lever 54' is connected to cage 60 by link 54, to slide up until pins 71 reach the ends of cam slots 70. At the same time, the slotted arms 74 of the forked levers 75 slide relative to the pins 71 on the lower end of the cage skirt, so that the automatic feathering action is not affected by the manual controls 75, and the lever 75 follows the feathering action.

*Forward flight from hovering position.*—To fly forwardly the steering handle 103 is pushed forwardly. To maintain full forward flight handle 103 is pushed all the way forward so that the point 44' of the lost motion assembly 106 goes past the middle of the distance between 42' to 43', and the 41' goes against stop 45'. This pushes levers 67 back as far as they will go, and the sleeve 50' being free to slide on the bar 53' the full distance between the stops 51', the handle 103 can be returned to the intermediate position while the mechanism is adjusted for forward flight. To take the rotor vanes out of the forward thrusting pitch, the handle 103 is pulled back until the point 44' goes beyond the middle point between 42' to 43', whereupon the levers 67 return to their intermediate positions by themselves and the craft resumes hovering flight because of the intermediate blade pitch thus induced.

When handle 103 and control frame 97 are swung forwardly or backwardly, bar 91 must follow but when 97 and 103 are swung from left to right, bar 91 is not affected.

When handle 103 is pushed forwardly levers 67 are pushed rearwardly. As levers 67 move toward the rear, one rod 61 rises and the companion opposite rod 61 subsides on the right side of the front unit, while on the rear unit the rod on the right side rises and the rod on the left side subsides. This produces the positive high pitch points on the left side of the front unit and on the right side of the rear unit, thereby inducing forward flight as the rotation of the units is illustrated and herein considered.

At the same time the vanes of the rear rotor unit 32 reach high pitch since the vanes of the front unit rotate counter-clockwise (top view) and the vanes of the rear unit rotate clockwise. The resulting thrust is forward.

*Reverse or rearward flight from hovering position.*—To fly rearwardly the pilot pulls back on the handle 103 and holds it back with force as long as he wants to fly backwards. When the pilot moves the handle 103 forwardly to intermediate position, rearward flight ceases and hovering flight is resumed.

When flying backwardly levers 67 are positioned forwardly and link 61 is depressed and link 61' is elevated.

At the same time link 61 is forced down and link 61' is forced upwardly on the other sleeve making the high pitch point at the other side of the rotor and the low pitch point at other side on the rotor from the above mentioned pitch points, as between the rotor units, so that the resulting thrust is backward.

*Right sidewise flight from hovering position.*—To fly sidewise to the right handle 103 is pushed (not rotated) toward the right so that frame 97 pivots on 91 at point 98 so that cable 88 is pulled forwardly and down over pulley 93, and at the same time cable 87 moves upwardly and backwardly over pulley 94. This actuates the cross bar 86 and its pinion 83 toward the right, whereby rods 81 and 81' are moved forwardly and rearwardly, respectively, and the levers 68 of the front and rear units rearwardly and forwardly, respectively. Since links 61 and 61' are connected to the pitch ring 57 at front and back simultaneously, the ring 57 is raised in front and lowered in the back on the front unit and oppositely on the rear unit.

As the pinion 83 is turned as indicated and the rods 81' and 81 move rearwardly and forwardly, respectively, the front unit lever 68 moves rearwardly and the lever 68 of the rear unit moves forwardly, and the related link 61 moves downwardly and the link 61' moves upwardly. This produces high and low pitch in the corresponding blades. Since direction of rotation as stated above is considered, thrust to the right is produced. This makes the craft fly sidewise toward the right.

*Left sidewise flight from hovering position.*—To fly sidewise to the left the lever 68 is pushed forwardly on the front unit, thereby forcing front rod 61 downwardly and its opposite rod upwardly, while on the rear unit the lever 68 is forced rearwardly, thereby forcing the front rod 61 upwardly and its opposite rod downwardly. As the pitch ring follows the high pitch points are at the rear of the front unit and at the front of the rear unit, thereby producing leftward thrust.

*Steering to the right.*—To steer to the right handle 103 is rotated to the right.

As handle 103 is rotated to the right cable 100 is wound around drum 101 and pulled through the hollow tubular frame 97, and out the opening therein and around pulley 105 so as to pull the yoke 92 rearwardly. The yoke 92 is connected to the pinion 83 by the rod 85 so that the entire assembly 82, 83, 84, and 81 and 81' slides backwardly and forces levers 68 on both sleeves 65' backwardly. On the front unit front links 61' are forced upwardly and its opposite rod downwardly and the front links 61 of rear unit are forced upwardly, and the corresponding rear rod downwardly, making corresponding high pitch points at the front of the units, producing rightward thrust.

On the rear unit links 61' are forced upwardly and links 61 downwardly, producing high pitch at a corresponding point. Noting the direction of rotation, the thrust at the first point is to the right and at the second point the thrust is to the left. This results in the craft being steered to the right.

Whether in hovering flight, forward or backward flight, power settling flight, power off settling flight, the craft is steered in the same way and the effect is the same.

*Steering to the left.*—Levers 68 of the lower sleeve of each unit are forced forwardly, thereby forcing the front rods 61 of each unit downwardly and the opposite rods upwardly, thereby producing positive high pitch points at the rear of both units, thereby effecting leftward thrust.

*Descending flight with power on.*—To descend with power on the vanes are not feathered, but the speed of the rotors is gradually reduced, while the vanes are fully feathered for lifting until the rotors fail to lift and actually lose altitude.

*Power off settling flight.*—The effect of the arrangement of the bore of tube 49 being ahead of the center of lift, and together the weight of 58, forces the vanes to tilt down until the pins 71 come into contact with the cam slots 70 in both the front and rear rotor units. The vanes then are at the proper pitch for gliding effect to that the craft can settle at a safe speed.

*Landing without or with power.*—To land with power, the controls are operated as in Descending flight with power on until the ground is reached. To land without power, the controls are operated as in Descending flight power off, except that the lever 75 is pulled down when the craft reaches a point only a few feet above the ground. This feathers all of the vanes to a lifting pitch so as to create a lift until the rotating momentum of the vanes is spent, thereby cushioning the shock of making contact with the ground.

Levers 78 and 79 are used to adjust the maximum climbing and gliding angles of the front rear units separately. The free wheeling unit 24' is essential to power off flight.

It will be understood that the invention can have the rotors revolve either in the directions shown in Figure 1 or in opposite directions, it being necessary only that the rotors turn in opposite directions.

It will be apparent to those skilled in the art that variations in the structural details can be made without departing from the invention, and it is therefore desired to expressly include all such changes in the disclosed structure as fall within the scope of the invention as defined by the appended claims.

What is claimed is:

1. An aircraft comprising an elongated body containing motor means, forward and rearward vertical axis lifting rotor units on the body, means connecting the rotor units for similar rotation, and driven by said motor means, said rotor units having changeable pitch blades and pitch changing means individual to each unit, each of said rotor units comprising a base supported at the top of the body, a cylinder rising from and fixed to the base, a lower antifriction bearing at the lower end of the cylinder and an upper antifriction thrust bearing at the upper end of the cylinder, a tube rotatably mounted in the bearings, a rotor shaft rotatably mounted in the tube and connected at its lower end to said motor means, a hub fixed on the upper end of the tube above the cylinder with blade shafts radiating therefrom, lifting blades having tubular roots journalled on the blade shafts, a spider fixed on the upper end of the rotor shaft including torque arms laterally displaced from the blade shafts and, said blade roots having radial arms operatively connected to said torque arms, and feathering means mounted on said cylinder and base for selectively rotating the blades on their blade shafts in opposite directions from a position of intermediate pitch.

2. An aircraft, as recited in claim 1, wherein said feathering means comprises a spherical cage splined for vertical movement on the upper part of said cylinder including a tubular skirt depending therefrom, an annulus surrounding and mounted on said spherical cage for vertical tilting movement thereon, a ring revolubly mounted on said annulus, and links operatively connecting points on said ring with eccentric portions on related blade roots.

3. An aircraft, as recited in claim 1, wherein said feathering means comprises a spherical cage splined for vertical movement on the upper part of said cylinder including a tubular skirt depending therefrom, an annulus surrounding and mounted on said spherical cage for vertical tilting movement thereon, a ring revolubly mounted on said annulus, links operatively connecting points on said ring with eccentric portions on related blade roots, and means for elevating and depressing said cage on said cylinder, the last mentioned means comprising cam elements on the lower end of the skirt of said spherical cage, and a rotary cam housing mounted on said base and formed with vertically angulated cam slots operatively receiving said cam elements.

4. An aircraft, as recited in claim 1, wherein said feathering means comprises a spherical cage splined for vertical movement on the upper part of said cylinder including a tubular skirt depending therefrom, an annulus surrounding and mounted on said spherical cage for vertical tilting movement thereon, a ring revolubly mounted on said annulus, links operatively connecting points on said ring with eccentric portions on related blade roots, and means for elevating and depressing said cage on said cylinder, the last mentioned means comprising cam elements on the lower end of the skirt of said spherical cage, and a rotary cam housing mounted on said base and formed with vertically angulated cam slots operatively receiving said cam elements, and tilting means for tiling said annulus relative to said spherical cage, comprising upper and lower sleeves rotatably mounted on said cylinder, means for selectively rotating the sleeves relative to each other, pairs of inclined diametrically opposed cam slots formed in the sleeves with the pairs of cam slots circumferentially spaced with respect to each other, cam links connected at their upper ends to correspondingly circumferentially spaced points on said ring and effectively engaged at their lower ends with the related cam slots in the corresponding sleeves, whereby rotation of either of the sleeves in either direction away from an intermediate position will elevate one side of the ring and depress the other and produce thereby corresponding changes in pitch of the propeller blades.

5. In a helicopter, a fuselage, two substantially horizontally disposed rotors spaced from the opposite ends of the fuselage, each of said rotors embodying a hub having blade shafts radiating therefrom and lifting blades journaled on each of said blade shafts, a vertically positioned shaft on the axis of the hub of each of said rotors, drive means in the fuselage, a horizontally disposed shaft extending through an end of the fuselage, a vertically positioned propeller carried by the extending end of said horizontally disposed shaft, means connecting said drive means to each of said vertically positioned shafts for rotating the latter, clutch means for connecting and disconnecting said horizontally disposed shaft to said drive means, a rotatable tube surrounding each of said vertically positioned shafts and having on its upper end fixedly mounted thereon a hub of one of said rotors, a spider provided with depending pitch levers fixedly mounted on the upper end of each of said vertically positioned shafts, the pitch levers being so arranged as to be laterally displaced from the blade shafts of said hubs, a radial lever carried by each of said blade shafts operatively connected to each of said pitch levers, control means for adjusting the pitch of the lifting blades of said rotors, and means actuating said control means from a point inside the fuselage.

6. In a helicopter, a fuselage, two substantially horizontally disposed rotors spaced from opposite ends of the fuselage, each of said rotors embodying a hub having blade shafts radiating therefrom and lifting blades journaled on each of said blade shafts, a vertically positioned shaft on the axis of the hub of each of said rotors, drive means in the fuselage, a horizontally disposed shaft extending through an end of the fuselage, a vertically positioned propeller carried by the extending end of said horizontally disposed shaft, means connecting said drive means to each of said vertically positioned shafts for rotating the latter, clutch means for connecting and disconnecting said horizontally disposed shaft to said drive means, a rotatable tube surrounding each of said vertically positioned shafts and having on its upper end fixedly mounted thereon a hub of one of said rotors, a fixed vertically disposed cylindrical tube extending upwardly from the fuselage and surrounding each of said tubes, a spider provided with depending pitch levers fixedly mounted on the upper end of each of said vertically positioned shafts, the pitch levers being so arranged as to be laterally displaced from the blade shafts of said hubs, a radial lever carried by each of said blade shafts operatively connected to each of said pitch levers, control means slidably mounted on each of said cylindrical tubes for adjusting the pitch of the lifting blades of said rotors, and means actuating said control means from a point inside the fuselage.

7. In a helicopter, a fuselage, two substantially horizontally disposed rotors spaced from opposite ends of the fuselage, each of said rotors embodying a hub having blade shafts radiating therefrom and lifting blades journaled on each of said blade shafts, a vertically positioned shaft on the axis of the hub of each of said rotors, drive means in the fuselage, a horizontally disposed shaft extending through an end of the fuselage, a vertically positioned propeller carried by the extending end of said horizontally disposed shaft, means connecting said drive means to each of said vertically positioned shafts for rotating the latter, clutch means for connecting and disconnecting said horizontally disposed shaft to said drive means, a rotatable tube surrounding each of said vertically positioned shafts and having on its upper end fixedly mounted thereon a hub of one of said rotors, a fixed vertically disposed cylindrical tube extending upwardly from the fuselage and surrounding each of said tubes, a spherical cage slidably mounted on the upper part of each of said cylindrical tubes, an annulus slidably mounted on each of said cages, a rotatable ring mounted on and around said annulus, links connecting said annulus to the blade shafts of each of said rotor hubs, means for manually tilting said annulus relative to said cage, a spider provided with depending pitch levers fixedly mounted on the upper end of each of said vertically positioned shafts, the pitch levers being so arranged as to be laterally displaced from the blade shafts of said hubs, a radial lever carried by each of said blade shafts operatively connected to each of said pitch levers, control means slidably mounted on each of said cylindrical tubes for adjusting the pitch of the lifting blades of said rotors, and means actuating said control means from a point inside the fuselage.

ROBERT G. HOPPES.

REFERENCES CITED

The following references are of record in the file of this patent:

UNITED STATES PATENTS

| Number | Name | Date |
|---|---|---|
| 1,783,011 | Florine | Nov. 25, 1930 |
| 1,869,453 | Williams | Aug. 2, 1932 |
| 1,927,966 | Vaughn | Sept. 26, 1933 |
| 1,986,709 | Breguet et al. | Jan. 1, 1935 |
| 2,233,747 | Riedl | Mar. 4, 1941 |
| 2,256,918 | Young | Sept. 23, 1941 |